(12) United States Patent
Hanes et al.

(10) Patent No.: US 7,509,355 B2
(45) Date of Patent: Mar. 24, 2009

(54) METHOD FOR TRANSFERRING AND INDEXING DATA FROM OLD MEDIA TO NEW MEDIA

(75) Inventors: David H Hanes, Loveland, CO (US); Stephen F Bayless, Fort Collins, CO (US); Michael D Krause, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 899 days.

(21) Appl. No.: 10/174,861

(22) Filed: Jun. 18, 2002

(65) Prior Publication Data
US 2002/0156784 A1    Oct. 24, 2002

Related U.S. Application Data

(63) Continuation of application No. 09/288,482, filed on Apr. 8, 1999, now Pat. No. 6,466,952.

(51) Int. Cl.
*G06F 17/30* (2006.01)
(52) U.S. Cl. .................. 707/204; 707/202; 707/3; 707/6
(58) Field of Classification Search ............... 707/1–3, 707/10, 200–205, 102, 100; 340/5.61
See application file for complete search history.

(56) References Cited

U.S. PATENT DOCUMENTS

| | | | | |
|---|---|---|---|---|
| 5,276,867 A | * | 1/1994 | Kenley et al. ............. 707/204 |
| 5,438,671 A | * | 8/1995 | Miles ......................... 707/200 |
| 5,677,899 A | | 10/1997 | Getreuer ................... 369/44.28 |
| 5,761,655 A | * | 6/1998 | Hoffman ....................... 707/4 |
| 5,784,562 A | * | 7/1998 | Diener ....................... 707/200 |
| 5,808,987 A | | 9/1998 | Oda et al. ...................... 369/47 |
| 5,815,659 A | | 9/1998 | Umetsu et al. ......... 395/200.33 |
| 5,819,296 A | | 10/1998 | Anderson et al. ........... 707/204 |
| 5,845,278 A | * | 12/1998 | Kirsch et al. ..................... 707/3 |
| 5,845,293 A | | 12/1998 | Veghte et al. .............. 707/202 |
| 5,864,871 A | * | 1/1999 | Kitain et al. ............. 707/104.1 |
| 5,873,103 A | * | 2/1999 | Trede et al. ............... 707/204 |

(Continued)

FOREIGN PATENT DOCUMENTS

GB    2296797 A    10/1996

OTHER PUBLICATIONS

Jacquelyn Gavron and Joseph Moran, How to Use Microsoft Windows NT 4 Workstation 1996, p. 42.*

(Continued)

*Primary Examiner*—Cam Y T Truong

(57) ABSTRACT

A computer-based method and apparatus transfer files from a source media to a destination media. In one embodiment, the presence of a source media in a source storage drive is detected. In response to the detection, a user is prompted to transfer files from the source media. Then, in response to user input, files are transferred from the source media to the destination media. In another embodiment, a user is prompted for a transfer session identifier. Data is then transferred from a source media to a subdirectory on a destination media. The subdirectory corresponds to the transfer session identifier. The method and apparatus aid in migrating computer data from one storage technology to another (e.g., from media based on an older technology to media based on a newer technology).

10 Claims, 5 Drawing Sheets

U.S. PATENT DOCUMENTS

| | | | | |
|---|---|---|---|---|
| 5,877,765 | A | * | 3/1999 | Dickman et al. ............. 345/600 |
| 5,936,542 | A | * | 8/1999 | Kleinrock et al. ........... 340/5.61 |
| 5,983,239 | A | | 11/1999 | Cannon ....................... 707/200 |
| 6,012,130 | A | * | 1/2000 | Beyda et al. ................. 711/173 |
| 6,014,631 | A | | 1/2000 | Teagarden et al. .............. 705/3 |
| 6,108,697 | A | * | 8/2000 | Raymond et al. ............ 709/218 |
| 6,185,574 | B1 | * | 2/2001 | Howard et al. ............... 707/200 |
| 6,199,146 | B1 | | 3/2001 | Pence ......................... 711/154 |
| 6,230,204 | B1 | * | 5/2001 | Fleming, III ................ 709/229 |
| 6,253,300 | B1 | * | 6/2001 | Lawrence et al. ........... 711/173 |
| 6,360,215 | B1 | * | 3/2002 | Judd et al. ...................... 707/3 |
| 6,442,587 | B1 | * | 8/2002 | Yoshida ...................... 709/203 |
| 6,604,118 | B2 | * | 8/2003 | Kleiman et al. ............. 707/203 |
| 2002/0184224 | A1 | * | 12/2002 | Haff et al. ..................... 707/10 |

OTHER PUBLICATIONS

Stefan M, Electroni Communication Device (p. 1).*
How Floppy Disk Drives (p. 1).*
U.S. Patent Application of Hanes, et al. titled "Method for Transferring and Indexing Data from Old Media to New Media," U.S. Appl. No. 09/288,482, filed Apr. 8, 1999.

* cited by examiner

20

NEW MEDIA DETECTION FUNCTION
*31*

FILE SELECTION FUNCTION
*32*

INDEXING FUNCTION
*33*

SEARCH FUNCTION
36

IMAGING FUNCTION
*34*

DATA TRANSFER FUNCTION
*35*

*FIG. 3*

METHOD FOR TRANSFERRING AND INDEXING DATA FROM OLD MEDIA TO NEW MEDIA

CROSS REFERENCE TO RELATED APPLICATION(S)

This is a continuation of application Ser. No. 09/288,482 filed on Apr. 8, 1999, now U.S. Pat. No. 6,466,952, which is hereby incorporated by reference herein.

FIELD OF THE INVENTION

The present invention pertains generally to computer storage technology, and, more particularly, to a method and apparatus for automatically migrating computer data from one storage technology to another.

BACKGROUND OF THE INVENTION

In today's computer storage industry, a number of peripheral storage options exist. These options include tape, floppy discs, compact discs (CD-WORMs, CD-RWs, DVDs), zip drives, and removable hard drives. As technology improves, new storage technologies have emerged. To add to the wealth of storage options, each technology has developed to offer a range of storage options within its own category. For example, in the floppy disc industry, the floppy disc media has progressed from 8½-inch floppies to 5¼-inch floppies to 3½-inch floppies. Within each media type, options exist as to the density of the data stored on the media (e.g., single-, double-, and high-density format).

As computers progress from one technology to another, or as earlier storage options become outdated by newer technologies that offer higher transfer rates, faster search speeds, higher density media, and/or lower costs, a need exists in the computer industry for a method of migrating files stored on one type of media to the newer type of media. For example, early versions of the personal computer (PC) were conventionally packaged with a 5¼-inch floppy drive that read from and stored data to either single-, double-, or high-density 5¼-inch floppy discs. Several years later, the 3½-inch floppy technology emerged. PC's were then conventionally packaged with dual disc drives, including one 5¼-inch floppy drive and one 3½-inch floppy drive. Later, as the 3½-inch floppy technology developed to offer its high-density format, the 5¼-inch floppy drives were increasingly, and eventually altogether, dropped from the standard PC packaging. A few years later, CD-ROM drives appeared, offering read-only capabilities. Again, conventional PC packaging began including dual 3½-inch and CD-ROM drives. Recently, the CD-RW drive, a CD-ROM technology with rewritable capabilities, has been introduced into the market. Because of the significant increase in storage density (1.44 MBytes for high-density 3½-inch floppies versus up to 650 MBytes for the currently available CD-rewritable discs), it is highly foreseeable that the CD-RW drive will become the storage peripheral that is conventionally packaged with PC's.

Computer users who have experienced one or more changes in standard peripheral storage technology will be familiar with the data organization problems that result from the transition from one storage technology to another. In many situations, a full transition from one storage technology to another is not performed immediately, or at all. In these cases, a user maintains drives of both technology types to allow data to be read from and/or stored to either type of media. Eventually, a full transition from the first storage technology to the newer storage technology is usually made for purposes of efficiency. However, in many cases, making the full transition from one storage technology to the other is necessary due to inconvenience of maintaining or the unavailability of a working drive for the older technology. In order to make a full transition, data stored on media using the older technology must be transferred to media based on the newer technology.

Currently, in order to transfer data from one media type to another, the user must manually attach to the first storage drive (typically by selecting the first storage drive via mouse clicks on the display), determine what files are contained on the first media, select the files to be transferred, attach to the second storage drive, and transfer the selected files onto the second storage media. Depending on the technology of the storage devices, the manual process can be more or less tedious. For example, when transferring data between devices that are both mapped drives (e.g., a floppy drive mapped to the a:\ drive and a CD-RW mapped to the d:\ drive), the process involves clicking on the a:\ drive icon, highlighting files and/or directories via mouse clicks, and dragging the highlighted files/directories to the d:\ drive icon. In other types of storage technology, such as tape drives, however, the manual process is far more complicated. Typically, tape drive systems are not mapped directly to a built-in mapped drive. Instead, to access the tape drive, the user must manually invoke special tape backup/restoration software to access the tape drive. The tape backup/restoration software must first position the tape to the volume information section, typically located at the beginning of the tape, begin reading volume information off the tape to determine what volumes are on it, position to the location of the desired volume, read the file structure information contained at the beginning of the volume, position to the desired file(s), and restore the desired file(s) to the local hard disk. Once the desired files are restored from tape, the user must then access the directory on the hard drive that the desired files were restored in, select the desired files, and then drag them to the destination drive. Clearly, when performed manually, the transfer process can be quite time consuming. No method currently exists for allowing automated migration of data from one storage technology to another. Accordingly, a need exists for an automated method for migrating data from one storage technology to another.

SUMMARY OF THE INVENTION

A novel method and apparatus for transferring files from a source media to a destination media is presented herein. In one embodiment, the presence of a source media in a source storage drive is detected. In response to the detection, a user is prompted to transfer files from the source media. Then, in response to user input, files are transferred from the source media to the destination media. In another embodiment, a user is prompted for a transfer session identifier. Data is then transferred from a source media to a subdirectory on a destination media. The subdirectory corresponds to the transfer session identifier. The method and apparatus aid in migrating computer data from one storage technology to another (e.g., from media based on an older technology to media based on a newer technology).

In accordance with another preferred embodiment of the invention, the automated data transfer application detects the insertion of a source storage media into a source storage device and automatically accesses the source storage device to determine the contents of the source storage media. In one embodiment, all files are automatically selected for transfer. In an alternative embodiment, the user selects a set of files to be transferred. The destination storage media is automatically mounted and the set of selected files are automatically transferred to the destination storage media. Preferably, the data transfer application allows the user to enter a transfer session identifier, which is used by the data transfer application to create a directory on said destination storage media into which the selected files are transferred.

In a preferred embodiment, an index comprising a set of keys for each selected file is automatically generated. Preferably, the index is saved along with the selected files on the destination storage media for use in performing searches of content of the transferred files. Preferably, the index is also stored in local memory such as the local hard drive of the computer system. This provides a global database of the contents of all migrated media, thereby facilitating a very fast search of the contents and locations of files whether or not the media on which the files are located is actually mounted.

The data transfer application preferably provides searching capability in which the keys contained in the index are searched to determine which keys, if any, contain a set of search fields. The search function returns the names and locations of the files associated with those keys that contain one or more of the set of search fields.

In addition, the data transfer application preferably provides sector-by-sector data imaging functionality which allows the transfer of source data to be copied sector-by-sector to create an image file from which the source media can be duplicated at a later time.

BRIEF DESCRIPTION OF THE DRAWING

The invention will be better understood from a reading of the following detailed description taken in conjunction with the drawing in which like reference designators are used to designate like elements, and in which:

FIG. 3 is a block diagram illustrating the functional units of the data transfer application implemented in accordance with the invention;

DETAILED DESCRIPTION

A novel method and apparatus for automatically migrating computer data from one storage technology to another is described in detail hereinafter. Although the illustrative embodiments of the invention are described within the context of transferring data stored on floppy discs to CD-RW discs, it will be appreciated by those skilled in the art that the inventive principles apply equally to the transfer of data from any type storage technology to any other type of storage technology.

Figure 1:
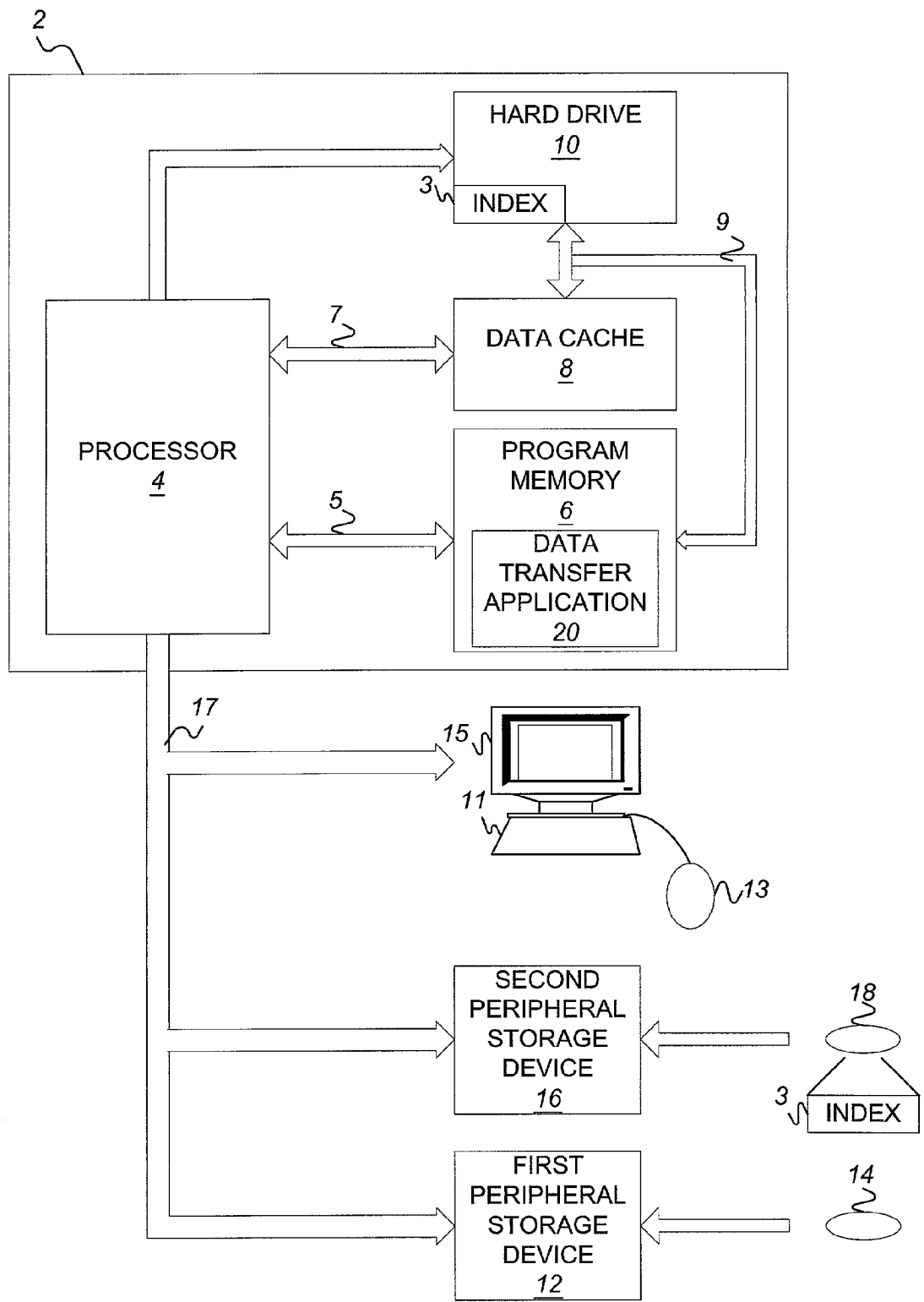
FIG. 1 is a block diagram of a computer system in which the invention operates.

FIG. 1 is a block diagram of a computer system 2 in which the invention operates. Computer system 2 includes a processor 4 which executes program instructions retrieved from a program memory 6 via an instruction bus 5. Program instructions are transferred in and out of program memory 6 from and to a local hard drive 10 via bus 9 as needed. During the course of program execution, processor 4 reads/writes data stored in data cache 8 via data bus 7. Data is also transferred in and out of data cache 8 from and to local hard drive 10 via bus 9 as needed.

Computer system 2 includes an input device such as a keyboard 11 and/or mouse 13 for receiving input commands from a user. Computer system 2 also includes an output display device 15 such as a monitor for displaying output from applications that are executed by processor 4.

Computer system 2 includes a first peripheral storage device 12 which stores data on media 14 of a first storage media type. Computer system 2 also includes a second peripheral storage device 16 which stores data on media 18 of a second media type. Processor 4 communicates with first and second peripheral storage devices 12 and 16 over one or more I/O buses 17. First and second peripheral storage devices may be integrated into the main box of computer system 2, reside external to the main box (shown), or one may be integrated into the main box while the other resides external to the main box. In the illustrative embodiment, first peripheral storage device 12 is a 3½-inch floppy drive and second peripheral storage device 16 is a CD-RW or a writeable DVD drive. However, it is to be understood that either storage device 12 or 16 may alternatively be a tape drive, 5¼" floppy drive, hard drive, ZIP drive, or any other type of now-existing or future data storage devices. In the illustrative embodiments that follow, first peripheral storage device 12 is used and herein referred to as the source storage device 12 and second peripheral storage device 16 is used and herein referred to as the destination storage device 16.

A data transfer software application 20 which contains program instructions embodying the present invention is executed from program memory 6 by processor 4.

Figure 2:
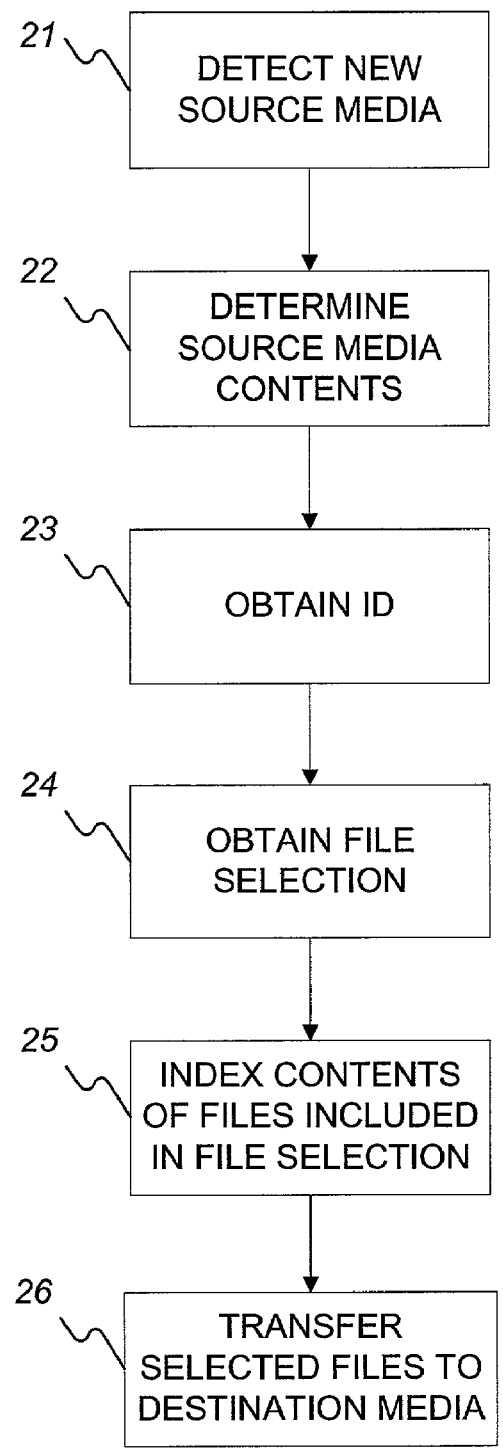
FIG. 2 is a flowchart illustrating the method of the invention.

FIG. 2 is a flowchart illustrating the operation of data transfer application 20. In the illustrative embodiment, the user inserts a disc 14 into source storage device 12. Data transfer application 20 detects 21 the presence of new media 14 in source storage device 12. In the preferred embodiment, data transfer application 20 communicates with source storage device 12 to learn the status of media in the drive, thereby providing automatic detection of new media 14 in the device 12. If the particular storage device does not support the detection of new media in the drive, application 20 provides a user interface 19 which allows the user to affirmatively indicate to the application 20 that new media 14 is present in the source storage device 12. Affirmative user indication may be required, for example, if the source storage device 12 comprises certain types of tape drives.

Once data transfer application 20 learns of the presence of new media in source storage device 12, it then determines 22 the contents of the source media 14. Depending on the storage technology of source storage device 12, data transfer application 20 may simply read a directory contained on the media 14 which indicates what files it contains, or it may have to actually read the media 14 itself to determine its contents. For example, if the source storage device 12 is a tape drive, data transfer application 20 automatically mounts the tape and determines its contents. It may achieve this by invoking a commercial tape backup/restoration software package to mount the tape and extract the volume and file information. Alternatively, these functions may be performed by the data transfer application 20 itself. Preferably, the names and organization of the files are displayed on the output display 15 via user interface 19.

Data transfer application 20 then obtains 23 an identifier for the transfer session. The identifier is used as the name of a subdirectory that is created on the second media 18 in the destination storage device 16. Preferably, user interface 19 provides a prompt for the user to enter a desired media identifier.

Data transfer application 20 then obtains 24 a selection of the files contained on the media 14 to be transferred. In a first embodiment, all of the files are automatically selected for transfer. In an alternative embodiment, data transfer application 20 presents a list of the names of the files contained on the media to the user via a user interface 19. The user then selects, via the user interface 19, a set of files from the list that are to be transferred. Preferably, data transfer application 20 allows the user to select groups of files to be transferred to different directories on the second storage media 18. In other words, the user could select a first group of files contained on the source storage media 14 to be transferred to one directory on the destination storage media 18, a second group of files contained on the source storage media 14 to be transferred to a different directory (or subdirectory) on the destination storage media 18, and so on. This capability enables disc organization by allowing the user to group files located on one disc and automatically move them to different locations on another disc.

When the files are selected to be transferred, a subdirectory containing the name of the identifier is created on the second destination media 18 the selected files are then transferred 26 to the destination media 18 under the newly created subdirectory identified by the identifier. In the case of both the source storage device 12 and the destination storage device 16 being mapped to a mapped drive, the selected files are transferred from the source storage device 12 to the destination storage device 16 directly. In the case of the source storage device 12 not being mapped to a mapped drive, the data transfer application 20 automatically handles the mounting of the source media 14. For example, if source storage device 12 is a tape drive, data transfer application 20 positions the tape to the location of the selected files, restores the selected files to local memory (i.e., the hard drive 10), and transfers the restored files to the destination media 18 on the destination storage device 16. In the case of the destination storage device 16 not being mapped to a mapped drive, the data transfer application 20 automatically handles the mounting of the destination media 18. For example, if the destination storage device 16 is a tape drive, data transfer application 20 mounts the storage media (18), positions the tape to the proper location, creates a volume identified by the identifier, positions the tape to the location of the newly created volume, and transfers the selected files to the destination media 18 on the destination storage device 16 in the newly created volume.

FIG. 3 is a block diagram illustrating the functionality of data transfer application 20. As illustrated, data transfer application 20 includes a new media detection function 31, a file selection function 32, and a data transfer function 35. Preferably, data transfer application 20 also includes one or both of an indexing function 33 and/or an imaging function 34.

New media detection function 31 handles the detection of the presence of new media 14 in source storage device 12. When media 14 is inserted in source storage device 12, new media detection function 31 preferably detects this condition. For example, if the interface is a Small Computer Systems Interface (SCSI), one bus line indicates whether media is present in the device. In this case, new media detection function 31 reads the status of this bus line to determine a change in media presence status. In devices that support different interfaces, often the device will support a tape status query instruction that may be issued by the new media detection function 31. Because some peripheral devices, such as certain tape drives, do not allow for the automatic detection of the presence of media in the drive, data transfer application 20 preferably includes a user input means for allowing the user to inform the data transfer application 20 that new media has been inserted in the source storage device 12. This is easily implemented as a dedicated icon 43 on an application user interface 19 that is displayed on output display 15. When a user clicks on the icon using a mouse 13 or other user input means (e.g., a keyboard), new media detection function 31 responds to the input in the same manner as if it had automatically detected the presence of new media in the device 12. This response triggers the application to automatically mount the newly detected source storage media 14, determine the contents of the newly detected media 14, and preferably display the contents to the user via user interface 19.

File selection function 32 allows the user to select a group of files to transfer to the second storage media 18 present in the destination storage device 16. If source storage device 12 is a tape drive, data transfer function 35 may invoke commercial tape backup/restoration software to mount the tape, extract volume information, position the tape to the desired volume, extract file information from the desired volume, and return the file information to the file selection function 32 for presentation to the user. Once the user selects the desired files from the presented available files, data transfer function 35 invokes the restore function of the commercial tape backup/restoration software to restore the selected files to local memory (i.e., the hard drive 10). Alternatively, the data transfer function 35 itself implements this functionality.

Preferably, file selection function 32 provides the ability to select different groups of files to be transferred to different directories on the second storage media 18. In this case, the user could select a first group of files contained on the first storage media 14 to be transferred to one directory (identified by a first user selected identifier) on the second storage media 18, a second group of files contained on the first storage media 14 to be transferred to a different directory (identified by a second user selected identifier) on the second storage media 18, and so on. This preferred embodiment of file selection function 32 enables disc organization by allowing the user to group files on a disc and automatically move them to different locations on the other disc.

Data transfer function 35 handles the communication between the source and destination storage devices 12 and 16 required to accomplish the data transfer. This involves communicating with the respective file systems and/or device drivers (not shown) of the storage devices 12 and 16, automatically mounting the destination storage media 18, and controlling the transfer of selected files to the destination storage media 18. If one of the devices 12 or 14 is a tape drive, data transfer function 35 may invoke commercial tape backup/restoration software to mount the tape, position it where the desired files are located, create a new volume identified by the transfer session identifier, and store the selected files to the tape. Alternatively, the data transfer function 35 itself could implement this functionality.

When the files are selected to be transferred, data transfer application 20 preferably indexes 25 the contents of the selected files. This is performed by indexing function 33. Preferably, when the files to be transferred are selected, an index 3 describing the contents of the selected files is created by the indexing function 33. For example, if the selected files to be transferred are word processing files, the contents of the index 3 would include a set of keys comprising information about the contents of the word processing files. The index 3 is preferably stored along with the selected files on the destination media 18. Then, at a later time, if the user wants to search for files containing certain text, data transfer application 20 searches the contents of the index 3 to find all the files that have corresponding keys that match one or more of the searched for text. In the preferred embodiment, the index 3 is also stored on the local hard drive 10 of the computer system 2. Storing the index 3 on the local hard drive 10 allows the user to perform a quick search for the location of and contents of a file without actually mounting the media 18 in the destination storage device 16. The index 3 stored on the local hard drive 10 thus operates as a global database of all known media, thereby significantly decreasing the search time by eliminating the necessity of serially mounting each available media to individually search its contents for a particular file or key.

In the preferred embodiment, the indexing function 33 determines the file type of each selected file, and based on the file type, reads the file using the file's format, and extracts a set of salient keys that are used to summarize the contents of the file. Preferably, indexing function 33 allows indexing of non-textual files such as image and audio files as well. The contents of a key varies depending on the type of file it is associated with. For example, text file keys generally comprise a set of text words or ASCII characters. Image file keys may comprise text extracted from the text portions of the image files such as the image title, image information such as color statistics or other compositional information, or may comprise actual portions of bitmap images that allow the user to search for images that contain another image such as a picture of a particular person or scene. Audio file keys may comprise text extracted from the text portions of the files such as the track titles or notes, or may comprise actual portions of digitized sound to allow the user to search for audio files that contain a given sequence of sounds. In other words, the indexing function 33 receives the name of a selected file and returns a set of keys that describe the contents of that file. In a preferred embodiment, the portion of indexing function 33 that indexes text files is implemented using methods such as that disclosed in U.S. Pat. No. 5,778,364 to Philip C. Nelson and assigned to Verity, Inc. of Mountain View, Calif., entitled "Evaluation Of Content Of A Data Set Using Multiple And/Or Complex Queries" or other commercially available indexing functions, which operates to scan a data set and create a set of summary sentences associated with the various files.

Figure 5:
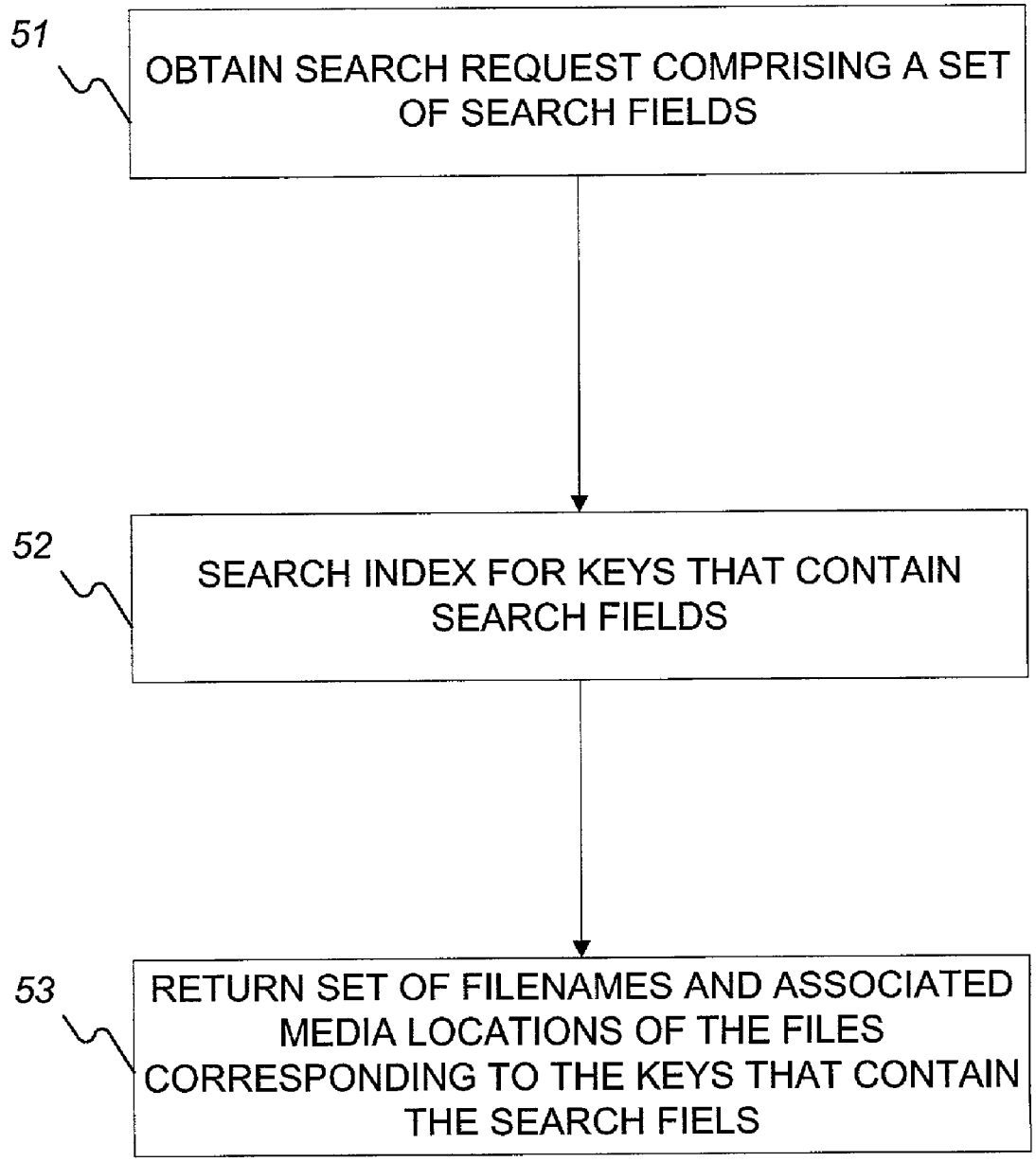
FIG. 5 is an operational flowchart of a search method which utilizes an index created by the invention.

Indexing function 33 may include a searching function 36. Searching function 36 allows a user to enter a set of search fields that are compared to all the keys in the index 3 and returns a set of filenames and associated file locations of those files that have corresponding keys that contain one or more of the search fields. FIG. 5 is an operational flowchart of a search method implementing search function 36. As illustrated, search function 36 obtains 51 a search request comprising a set of search fields. The search fields can include text, portions of bitmaps, audio format information, etc. Search function 36 then searches 52 the index, located either on the destination media 18 or on the local hard drive 10, for keys that contain the search fields. Search function 36 then returns 53 a set of filenames and associated media locations of the files corresponding to the keys that contain the search fields.

Preferably, data transfer application 20 also includes an imaging function 34. The imaging function 34 creates an image of the entire source media 14, allowing the user to recreate the original media 14 in its entirety at a later time. In other words, the imaging function 34 is used to duplicate the same sector-by-sector image as the original media 14 onto another media of the same type as the original media 14. The imaging function 34 performs a raw data read to create the image file rather than a copy function which generally returns the file organized according to its logical structure.

Figure 4:
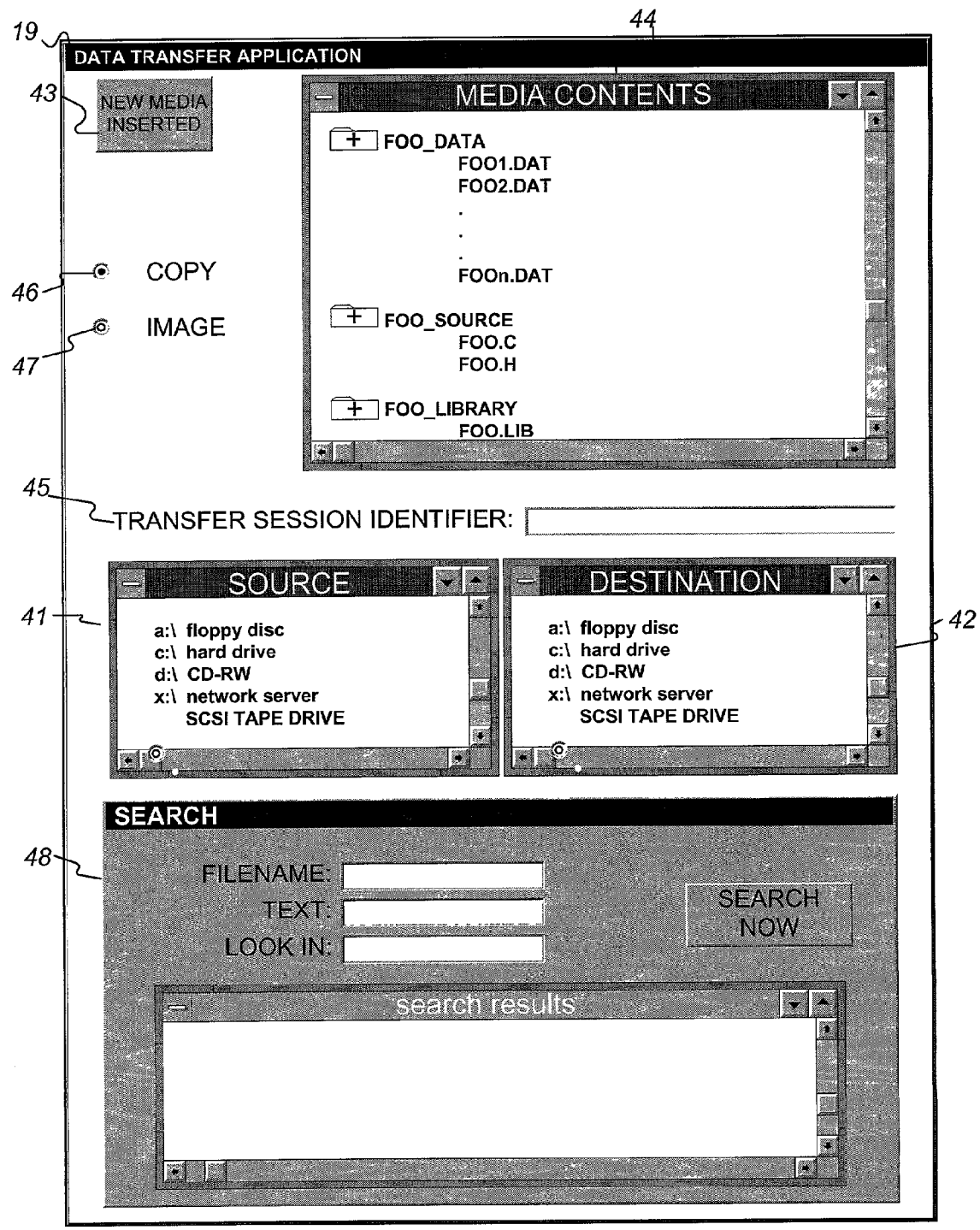
FIG. 4 is a diagram illustrating an example user interface that interacts with the data transfer application of the invention.

FIG. 4 is a diagram illustrating an example user interface 19 which interacts with the data transfer application 20. As illustrated, user interface 19 includes a source device window 41 that allows the user to select the device from which files will be transferred. In the illustrative embodiment, the user may select any number of source devices, including the floppy drive (a:) 12, the hard drive (c:) 10, the CD-RW drive (d:) 16, a network server (x:) to which computer system 2 is attached in this particular illustration (not shown), or an external tape backup drive (also not shown in FIG. 1). As is to be understood, the data transfer method may be applied to migrate data between any of the mounted storage devices, including the local hard drive 10 and network servers (not shown). User interface 19 also includes a destination device window 42 that allows the user to select the device to which files will be transferred. The list of available destination devices is the same as the list of source devices.

User interface 19 preferably includes a new media inserted icon 43 that allows the user to manually inform the data transfer application 20 that new media 14 was inserted in the source storage device 12. Icon 43 is used in cases where the data transfer application 20 cannot automatically detect the insertion of new media in the selected source drive.

Once new media is detected or indicated via icon 43, media contents window 44 displays the directories and filenames of the files contained on the source media. In the illustrative embodiment, the source media contains three directories, including FOO_DATA, FOO_SOURCE, and FOO_LIBRARY. Each directory contains a set of files foo1.dat, foo2.dat, . . . , fooN.dat; and foo.c, foo.h; and foo.lib, respectively.

A transfer session identifier window 45 prompts the user for the identifier of the transfer that will be used as the directory name on the destination media.

A copy option button 46 and an image option button 47 respectively allow the user to select the method of data transfer—either a logical copy or a raw data copy, or both.

User interface 19 also preferably includes a search window 48 which interacts with the indexing function 33 of data transfer application 20 to allow the user to specify a filename, search fields to search on, and the directory or drive to search in. Search window 48 includes a search results window which displays the results of the search of the index.

It will be appreciated from the above detailed description that the present invention provides several advantages over the prior art. Unlike the prior art, which required manual attachment to each of the source and destination drives, manual file selection and directory creation, the present invention provides an efficient automated process for migrating data from old media to new media. In addition, the invention provides for the automatic indexing of migrated files, which in turn allows for very fast searching of migrated files even when the media on which the files are located are not actually mounted at the time of the search. The elimination of the need to mount each media before it can be searched achieves a significant savings in terms of time and user intervention, resulting in a very powerful search technique. Finally, unlike the prior art, the data transfer application of the invention preferably offers both a logical file copy option and a raw data transfer option. The raw data transfer option allows the user to create an image file of the source media which may be used to duplicate the source media sector-for-sector.

What is claimed is:

1. A computer-based method for migrating data between storage media of different types, comprising:
   a) detecting presence of a removable source media of a first media type in a source storage drive;

b) in response to said detecting, automatically prompting a user to transfer files from said removable source media to removable destination media of a second media type in a destination storage drive, said first media type is different than said second media type;

c) automatically selecting all files stored in said removable source media for transfer to said removable destination media;

d) in response to user input, automatically transferring said all files from said removable source media in said source storage drive to said removable destination media in said destination storage drive by performing a raw data read of said removable source media thereby creating an image of all data in said removable source media;

e) creating an index of said transferred all files in response to said user input, said index comprising a plurality of keys for one file of said transferred all files, each key of said keys respectively matching text within said one file; and f) storing said index on a local hard drive of a computer system which communicates with said destination storage drive holding said removable destination media and said source storage drive holding said removable source media.

2. The method as in claim 1, wherein:
a) said removable source media is a floppy disk; and
b) said removable destination media is a compact disc.

3. The method as in claim 1, wherein detecting the presence of said removable source media in said source storage drive comprises detecting an insertion of said removable source media into said source storage device.

4. The method as in claim 1, further comprising:
a) searching for files on said removable destination media based on said index stored on said local hard drive; and
b) locating at least one file based on said searching.

5. Apparatus for migrating data between storage media of different types, comprising:
a) a program memory; and
b) a data transfer application comprising program instructions stored in the program memory, said program instructions defining:
i) a user interface that prompts a user to transfer files from a removable source media of a first storage media type;
ii) a storage source media detection function for detecting said removable source media in a source storage drive and, upon said detection, automatically displaying said user interface;
iii) a data transfer function, said data transfer function automatically selecting for transfer to a removable destination media of a second storage media type all files stored in said removable source media and automatically transferring said all files from said removable source media to said removable destination media, in response to user input to said user interface by performing a raw data read of said removable source media thereby creating an image of all data in said removable source media, wherein said first storage media type is different than said second storage media type; and
iv) an indexing function, said indexing function creating an index of said all files transferred by said data transfer function, said index comprising a plurality of keys for one file of said transferred all files, each key of said keys respectively matching text within said one file, said indexing function storing said index on a local hard drive of the apparatus.

6. The apparatus as in claim 5, wherein said source media detection function reads a status of a bus line, said bus line indicating a change in media presence status in said source storage drive.

7. The apparatus as in claim 5, wherein said source media detection function comprises program instructions for issuing a status query instruction to said source storage drive.

8. The apparatus as in claim 5, wherein said indexing function is configured to receive a filename of said one file and to return said keys in response to said filename.

9. A computer for migrating data files from media based on an old technology to media based on a new technology, comprising:
a) a first drive for receiving removable media of a first type;
b) a second drive for receiving removable media of a second type, said second type is different than said first type;
c) a data transfer application configured to automatically detect a presence of a removable source media in said first drive and to automatically prompt a user to transfer files from said removable source media to said second drive in response to an automatic detection of said presence by said data transfer application, said data transfer application further configured to automatically select for transfer to a removable destination media in said second drive all files stored in said removable source media and to automatically transfer said all files from said removable source media to said removable destination media by performing a raw data read of said removable source media thereby creating an image of all data in said removable source media, wherein said data transfer application further creates an index of said transferred all files, said index comprising a plurality of keys for one file of said transferred all files, each key of said keys respectively matching text within said one file, wherein said data transfer application stores said index on a local hard drive of the computer.

10. The computer as in claim 9, wherein said data transfer application is configured to automatically select, in response to said automatic detection, said removable destination media in said second drive for receiving the transferred files.

* * * * *